(12) United States Patent
de la Fuente (10) Patent No.: US 10,802,612 B2
(45) Date of Patent: Oct. 13, 2020

(54) ELECTRONIC STYLUS WITH RETENTION MECHANISM THAT CHARGES BATTERY FROM COMPUTING DEVICE

(71) Applicant: GOOGLE LLC, Mountain View, CA (US)

(72) Inventor: Valentin de la Fuente, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/243,770

(22) Filed: Jan. 9, 2019

(65) Prior Publication Data
US 2020/0103986 A1    Apr. 2, 2020

Related U.S. Application Data

(60) Provisional application No. 62/739,128, filed on Sep. 28, 2018.

(51) Int. Cl.
| | |
|---|---|
| *G06F 3/0354* | (2013.01) |
| *G06F 3/041* | (2006.01) |
| *G06F 3/038* | (2013.01) |
| *H02J 7/00* | (2006.01) |

(52) U.S. Cl.
CPC .......... *G06F 3/03545* (2013.01); *G06F 3/038* (2013.01); *G06F 3/041* (2013.01); *H02J 7/0045* (2013.01)

(58) Field of Classification Search
CPC ............. G06F 3/03545; G06F 3/03546; G06F 3/03542; G06F 3/038; G06F 3/041; H02J 7/0045
See application file for complete search history.

(56) References Cited

U.S. PATENT DOCUMENTS

| | | | | |
|---|---|---|---|---|
| 5,756,941 | A | * | 5/1998 | Snell ..................... G06F 1/1626 178/19.01 |
| 8,419,222 | B2 | * | 4/2013 | Hu ........................... G09G 3/14 362/118 |
| 9,025,318 | B2 | | 5/2015 | Ashcraft et al. |
| 9,660,477 | B2 | | 5/2017 | Dowd et al. |
| 2002/0190823 | A1 | * | 12/2002 | Yap ....................... G06F 1/1616 335/205 |

(Continued)

FOREIGN PATENT DOCUMENTS

CN            206657272 U    11/2017

OTHER PUBLICATIONS

International Search Report and Written Opinion for Application No. PCT/US2019/039422, dated Sep. 26, 2019, 15 pages.

*Primary Examiner* — Tom V Sheng
(74) *Attorney, Agent, or Firm* — Brake Hughes Bellermann LLP (57) ABSTRACT

An electronic stylus can include an elongated body, a rechargeable battery supported by the elongated body, a retention mechanism extending from the elongated body, a retention mechanism, and a release mechanism. The retention mechanism can include an electrically conductive contact. The electrically conductive contact can be electrically coupled to the rechargeable battery. The release mechanism can be configured to cause the electrically conductive contact to retract within the retention mechanism.

21 Claims, 9 Drawing Sheets

(56) References Cited

U.S. PATENT DOCUMENTS

| | | | |
|---|---|---|---|
| 2003/0151887 A1* | 8/2003 | Siddiqui | G06F 1/1626 361/679.11 |
| 2004/0056949 A1* | 3/2004 | Lin | B43K 29/00 348/61 |
| 2007/0075987 A1* | 4/2007 | Liu | G06F 1/1626 345/179 |
| 2011/0279081 A1* | 11/2011 | Cacioppo | G06F 3/03545 320/108 |
| 2012/0281366 A1* | 11/2012 | Strittmatter | H01M 2/1066 361/724 |
| 2013/0249870 A1* | 9/2013 | Slaby | G06F 3/044 345/179 |
| 2013/0285989 A1* | 10/2013 | Jones | G06F 3/03545 345/179 |
| 2014/0029182 A1* | 1/2014 | Ashcraft | G06F 1/26 361/679.4 |
| 2014/0078116 A1 | 3/2014 | Mercea et al. | |
| 2015/0324019 A1* | 11/2015 | Takahashi | G06F 3/03545 345/179 |
| 2017/0222456 A1 | 8/2017 | Perez et al. | |
| 2018/0011557 A1* | 1/2018 | Katsurahira | G06F 3/03 |
| 2018/0059817 A1* | 3/2018 | Pirie | G06F 3/03545 |
| 2018/0188834 A1 | 7/2018 | Yang | |
| 2018/0191184 A1 | 7/2018 | Yang | |
| 2019/0237986 A1* | 8/2019 | Agarwal | H02J 7/0045 |
| 2019/0369758 A1* | 12/2019 | Yamashita | G06F 3/0414 |

\* cited by examiner

ELECTRONIC STYLUS WITH RETENTION MECHANISM THAT CHARGES BATTERY FROM COMPUTING DEVICE

PRIORITY CLAIM

This application is a Nonprovisional of, and claims priority to, U.S. Provisional Application No. 62/739,128, filed on Sep. 28, 2018, entitled, "Electronic Stylus with Retention Mechanism that Charges Battery From Computing Device," the disclosure of which is hereby incorporated by reference.

TECHNICAL FIELD

This description relates to electronic styluses.

BACKGROUND

Electronic styluses can be used to provide input to computing devices, enabling a user to provide input to the computing device as if drawing on a piece of paper. Active styluses, which transmit signals indicating a location of the stylus, can include electronic components that make the stylus too thick to store inside the computing device.

SUMMARY

An electronic stylus can include a retention mechanism that includes an electrical contact. The retention mechanism can secure the electronic stylus to a computing device while the electrical contact conducts electricity from the computing device to a rechargeable battery of the stylus. A release mechanism can cause the electrical contact to retract within the retention mechanism, releasing the stylus from the computing device.

According to an example, an electronic stylus can include an elongated body, a rechargeable battery supported by the elongated body, a retention mechanism extending from the elongated body, a retention mechanism, and a release mechanism. The retention mechanism can include an electrically conductive contact. The electrically conductive contact can be electrically coupled to the rechargeable battery. The release mechanism can be configured to cause the electrically conductive contact to retract within the retention mechanism.

According to an example, a method of securing and releasing an electronic stylus to and from a computing device can include pressing a retention mechanism of the electronic stylus against a spring-loaded cover of the computing device, the pressing the retention mechanism against the spring-loaded cover causing the spring-loaded cover to retract into the computing device and an electrically conductive contact of the retention mechanism to retract into an arm portion of the retention mechanism until the retention mechanism is fully inserted into the computing device, at which point the electrically conductive contact extends beyond the arm portion, securing the retention mechanism inside the computing device. The method can also include pressing on a button of a release mechanism of the electronic stylus, the pressing on the button of the release mechanism causing the electrically conductive contact to retract into the arm portion, releasing the electronic stylus from the computing device.

According to an example, a method of securing and releasing an electronic stylus to and from a computing device can include receiving pressure on a retention mechanism of the electronic stylus, the pressure on the retention mechanism causing the retention mechanism to press against a spring-loaded cover of the computing device, the pressing the retention mechanism against the spring-loaded cover causing the spring-loaded cover to retract into the computing device and an electrically conductive contact of the retention mechanism to retract into an arm portion of the retention mechanism until the retention mechanism is fully inserted into the computing device, at which point the electrically conductive contact extends beyond the arm portion, securing the retention mechanism inside the computing device. The method can also include receiving pressure on a button of a release mechanism of the electronic stylus, the pressure on the button of the release mechanism causing the electrically conductive contact to retract into the arm portion, releasing the electronic stylus from the computing device.

According to an example, a computing device can include a processor, a power source electrically coupled to the processor, a chassis enclosing the processor and the power source, the chassis defining an aperture, a spring-loaded cover biased to rest in the aperture, and a charging pad adjacent to the spring-loaded cover, the charging pad being electrically coupled to the power source.

According to an example, a system can include a computing device and an electronic stylus. The computing device can include a processor, a power source electrically coupled to the processor, a chassis enclosing the processor and the power source, the chassis defining an aperture, a spring-loaded cover biased to rest in the aperture, and a charging pad adjacent to the spring-loaded aperture, the charging pad being electrically coupled to the power source. The electronic stylus can include an elongated body comprising a writing end portion, a back end portion being opposite from the writing end portion, a rechargeable battery supported by the elongated body, a retention mechanism extending from the elongated body, the retention mechanism including an electrically conductive contact, the electrically conductive contact being electrically coupled to the rechargeable battery, the retention mechanism pressing the spring-loaded cover into the computing device, the electrically conductive contact being coupled to the charging pad, conducting current to the rechargeable battery, and securing the electronic stylus to the computing device by engaging the chassis, and a release mechanism configured to cause the electrically conductive contact to retract within the retention mechanism, disengaging the electrically conductive contact and releasing the electronic stylus from the computing device.

The details of one or more implementations are set forth in the accompanying drawings and the description below. Other features will be apparent from the description and drawings, and from the claims.

DETAILED DESCRIPTION

Figure 1:
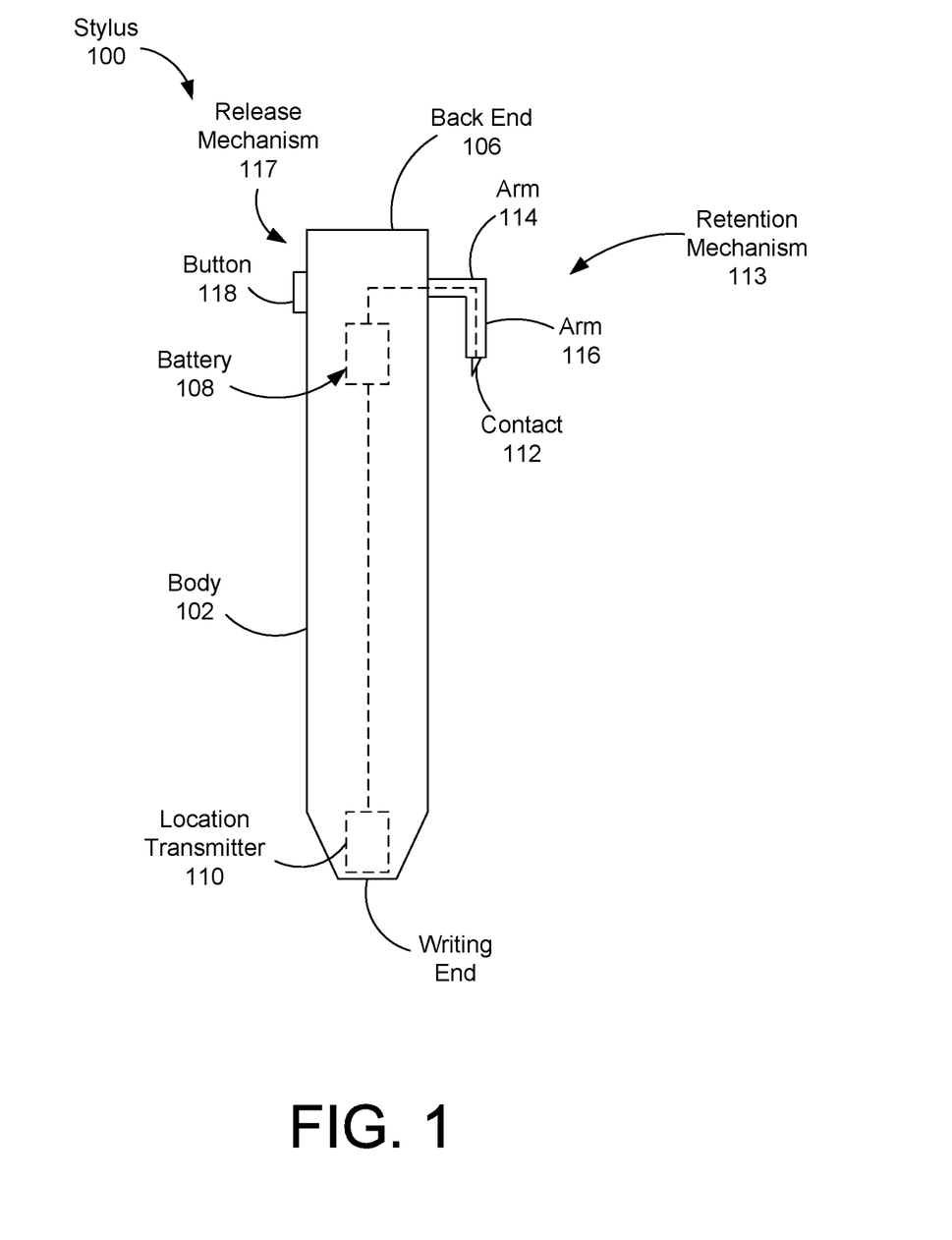
FIG. 1 is a diagram of an electronic stylus according to an example embodiment.

FIG. 1 is a diagram of an electronic stylus according to an example embodiment. The electronic stylus 100 can have an elongated body 102, being longer in a first direction from a writing end portion 104 to a back end portion 106 than in a second direction perpendicular to the first direction. The back end portion 106 can be opposite from the writing end portion. A diameter of the writing end portion 104 can narrow as a distance of the writing end portion 104 from the back end portion increases. The writing end portion 104 can be conical or rounded.

A user can place the stylus 100 near or on a display of a computing device (shown in subsequent figures) to provide input to the computing device, treating the stylus 100 like a pen to write on the display. The stylus 110 can include a location transmitter 110, proximal to the writing end portion 104 and/or closer to the writing end portion 104 than to the back end portion 106. The location transmitter 110 can indicate to the computing device the location of the stylus 100, and the computing device can respond, such as by a drawing program adding lines or other graphical output to portions of the display proximal to the stylus 100.

The stylus 100 can include a rechargeable battery 108. The rechargeable battery 108 can provide power to the location transmitter 110. The rechargeable battery 108 can recharge by receiving current and/or electricity from the computing device.

The stylus 100 can include a retention mechanism 113. The retention mechanism 113 can be disposed closer to the back end portion 106 of the stylus 100 than to the writing end portion 104 of the stylus 100. In the example shown in FIG. 1, the retention mechanism 113 can include a first arm portion 114 and a second arm portion 116. The first arm portion 114 can extend away from the elongated body 102. The second arm portion 116 can extend from the first arm portion 114 in a direction that is parallel to the direction that the elongated body 102 extends, such as from the back end portion 106 to the writing end portion 104.

In some examples, the first arm portion 114 and the second arm portion 116 can be connected to form an L-shaped retention mechanism. In some examples, the arms 114, 116 can be connected to form a right angle at a point where the two arms 114, 116 are connected to each other and/or are integrally formed. In some examples, the retention mechanism 113 is not L-shaped, but can be other shapes due to the lengths of the arm portions 114, 116.

The retention mechanism 113 can include an electrically conductive contact 112. The electrically conductive contact 112 can electrically couple the battery 108 to a power source in the computing device, enabling the battery 108 to receive power from the computing device. The electrically conductive contact 112 can extend into and/or through the first and second arm portions 114, 116. In a biased state, the electrically conductive contact 112 can extend beyond the second arm portion 116. The extension of the electrically conductive contact 112 beyond the second arm portion 116 can secure the stylus 100 to the computing device, as shown and described with respect to FIGS. 3 and 6B.

The stylus 100 can also include a release mechanism 117. The release mechanism 117 can release the stylus 100 from the computing device. In some examples, the release mechanism 117 can cause the electrically conductive contact 112 to retract within and/or into the retention mechanism 113 so that the stylus 100 is no longer secured to the computing device. The release mechanism 117 can, for example, cause the electrically conductive contact 112 to retract into and/or within the second arm portion 116 of the retention mechanism 113.

In some examples, the release mechanism 117 can include a button 118. The button 118 can cause the electrically conductive contact 112 to retract into and/or within the retention mechanism 113 and/or second arm portion 116 in response to pressure applied to the button 118.

Figure 2A:
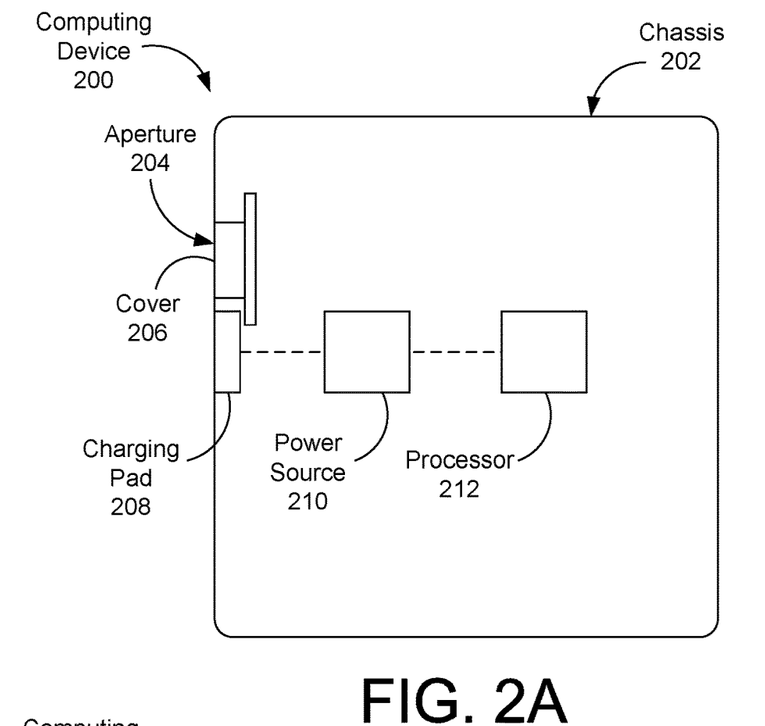
FIG. 2A is a cutout view of a computing device according to an example embodiment.

FIG. 2A is a cutout view of a computing device 200 according to an example embodiment. The computing device 200 can interact with the stylus 100 by receiving input from the stylus 100, such as indications of locations of the stylus 100 near and/or on a display 222 (shown in FIG. 2B) of the computing device, by securing the stylus 100 to the computing device 200, and/or by recharging the stylus 100.

The computing device 200 can include a processor 212. The processor 212 can execute instructions such as instructions stored in memory. The memory may be included in the processor, or in a separate device included in the computing device 200.

The computing device 200 can include a power source 210. The power source 210 can provide power to components of the computing device 200 such as the processor 212 and/or the display 222. The power source 210 can also provide power to the battery 108 and/or recharge the battery 108.

The computing device 200 can include a charging pad 208. The charging pad 208 can be coupled to the power source 210. The charging pad 208 can contact the electrically conductive contact 112 of the stylus 100 when the stylus 100 is secured to the computing device 200. The charging pad 208 can conduct electricity from the power source 210 to the battery 108 via the electrically conductive contact 112 when the stylus 100 is secured to the computing device 200, recharging the battery 108.

The computing device 200 can include a chassis 202. The chassis 202 can enclose, surround, and/or support components and/or devices of the computing device 200, such as the processor 212 and/or power source 210.

The chassis 202 can define an aperture 204. The aperture 204 can receive the retention mechanism 113, which can include the arm portions 114, 116, when the stylus 100 is secured to the computing device 200.

The computing device 200 can include a cover 206. The cover 206 can fit inside and/or fill the aperture 204. The cover 206 can be spring-loaded, and/or biased, to rest in the aperture 204. In the biased position, the cover 206 can be flush with an outer portion of the chassis 202, creating a smooth appearance from outside the computing device 200.

The cover 206 can be adjacent to the charging pad 208. The retention mechanism 113, which can include the arm portions 114, 116, can press the cover 206 into an interior portion of the computing device 200. The retention mechanism 113 can occupy some of the space previously occupied by the cover 206. When the electrically conductive contact 112 extends beyond the retention mechanism 113 inside the computing device 200, the electrically conductive contact 112 can engage and/or contact the charging pad 208, electrically coupling the electrically conductive contact 112 to the charging pad 208 and enabling current to flow from the power source 210 to the battery 108.

Figure 2B:
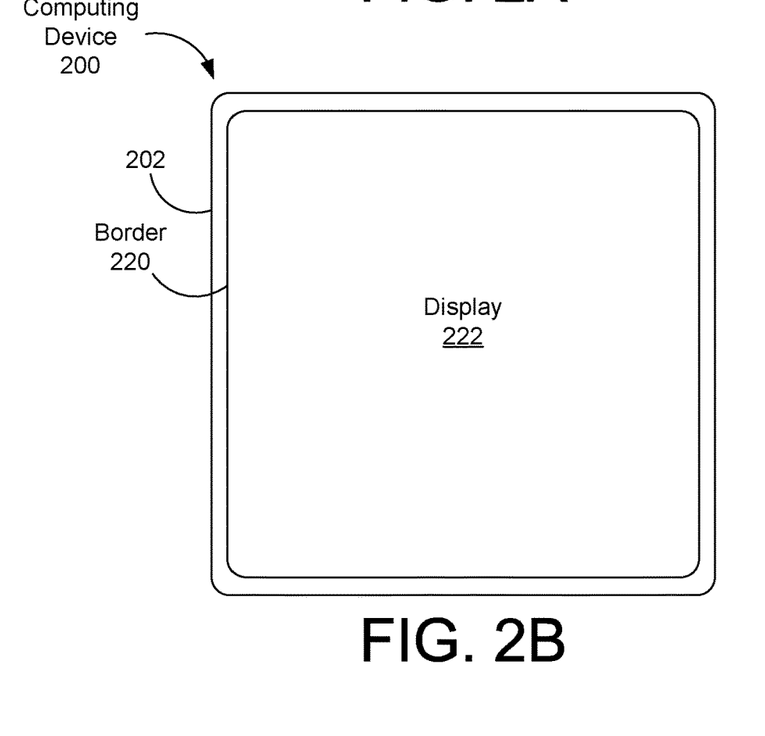
FIG. 2B is a top view of the computing device according to an example embodiment.

FIG. 2B is a top view of the computing device 200 according to an example embodiment. The computing device 200 can include a display 222. The display 222 can be surrounded and/or supported by a border 220. The border 220 can be surrounded and/or supported by the chassis 202.

The display 222 can present graphical output. The display 222 can also receive input, such as touch input and/or input from the stylus 100. The display 222 can, for example, receive signals from the location transmitter 110 indicating a location of the stylus 100 and/or location transmitter 110 with respect to the display 222.

Figure 3:
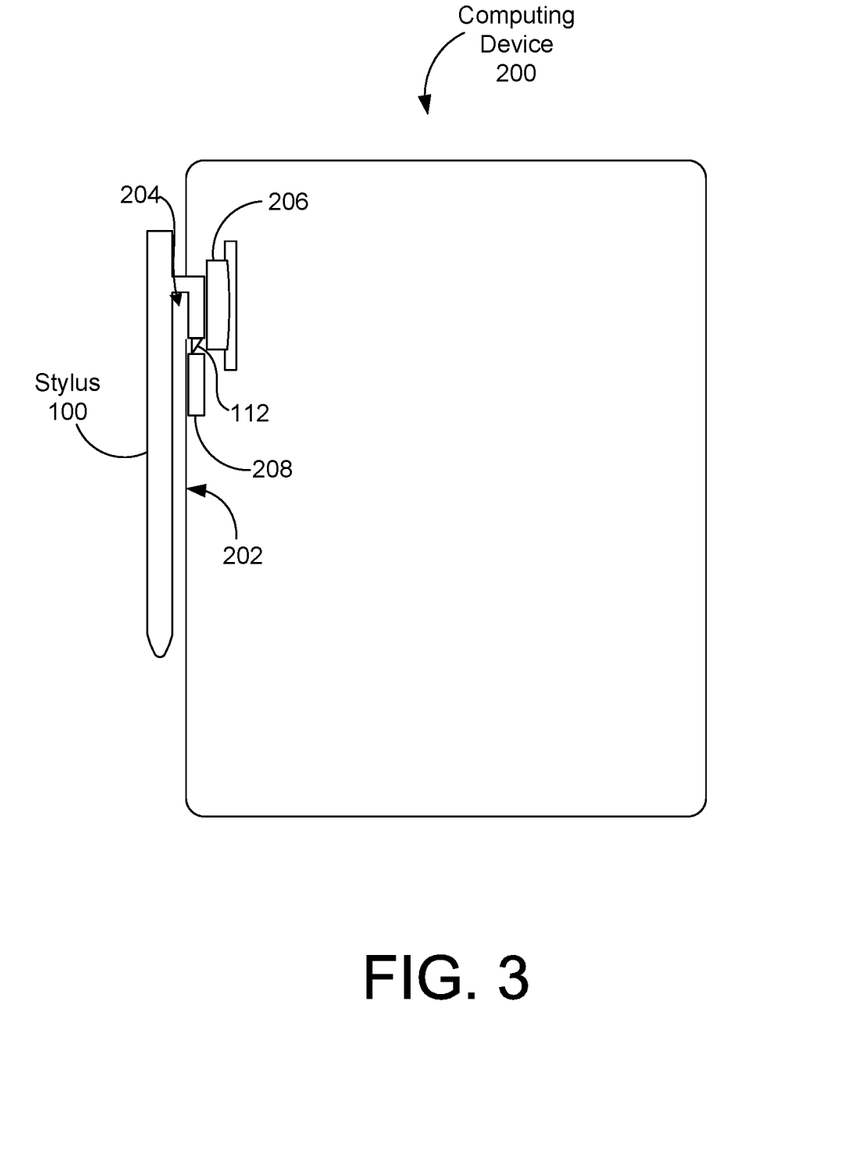
FIG. 3 is a diagram showing the stylus secured in the computing device according to an example embodiment.

FIG. 3 is a diagram showing the stylus 100 secured in the computing device 200 according to an example embodiment. In this example, the retention mechanism 113 of the stylus 100 has entered the computing device 200 through the aperture 204. In this example, a portion of the retention mechanism 113, such as the second arm portion 116, is in contact with the cover 206 and pressed the cover 206 into the computing device 200.

In the example shown in FIG. 3, the electrically conductive contact 112 is in contact with the conductive pad 208, electrically coupling the electrically conductive contact 112 to the conductive pad 208 and enabling electricity to flow from the power source 210 to the battery 108. In this example, the extension of the electrically conductive contact 112 beyond the second arm portion 116 (not labeled in FIG. 3) secures the stylus 100 to the computing device by engaging the chassis 202.

Figure 4A:
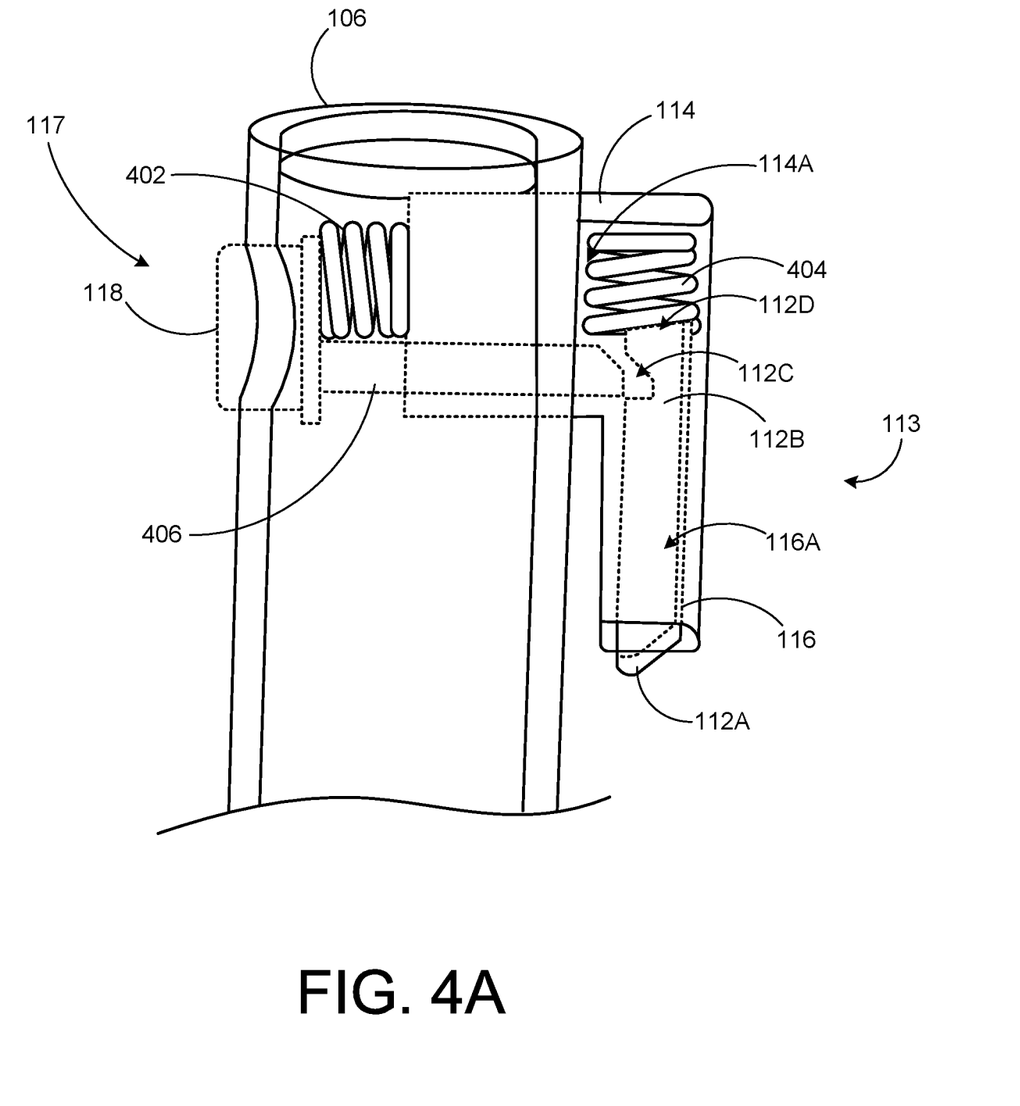
FIG. 4A is a diagram showing a portion of the electronic stylus according to an example embodiment.

FIG. 4A is a diagram showing a portion of the electronic stylus 100 according to an example embodiment. In some examples, the second arm 116 of the retention mechanism 113 can define an aperture 116A or tunnel in which the electrically conductive contact 116 (not separately labeled in FIG. 4A) is disposed.

In some examples, the electrically conductive contact 112 can include a chamfered clip at an end portion 112A. The chamfered clip at the end portion 112A can cause the electrically conductive contact 112 to retract into the second arm portion 116 in response to pressure from the chassis 202 as the retention mechanism 113 and/or arm portion 116 is pressed against the cover 206 and into the aperture 204.

A body portion 112B of the electrically conductive contact 112 can define an aperture 112C. The aperture 112C can be triangular, and/or can narrow as the aperture 112C extends into the body portion 112B of the electrically conductive contact 112. The triangular and/or narrowing shape of the aperture 112C can cause the electrically conductive contact 112 to retract into the second arm portion in response to pressure from a chamfered clip 406A (labeled in FIG. 4B) included in the release mechanism 117 of the stylus 100. The electrically conductive contact 112 can include an end portion 112D opposite from the chamfered end portion 112A.

The retention mechanism 113 can include a spring 404 and/or coil. The spring 404 can be disposed inside the first arm portion 114. The spring 404 can be disposed inside a cavity 114A of the first arm portion 114A. The spring 404 can apply pressure to the end portion 112D of the electrically conductive contact 112. The spring 404 can, by applying pressure to the end portion 112D of the electrically conductive contact 112, bias the end portion 112A and/or chamfered clip of the electrically conductive contact 112 to extend away from the retention mechanism 113 and/or to extend beyond the second arm portion 116.

The release mechanism 117 can cause the chamfered end portion 112A to retract into the second arm portion 116 in response to pressure. The release mechanism 117 can include the button 118, a rod 406 that engages the electrically conductive contact 112, and a spring 402. The spring 402 can bias the button 118 away from the elongated body. The spring 402 can bias the rod 406 away from the electrically conductive contact 112.

Figure 4B:
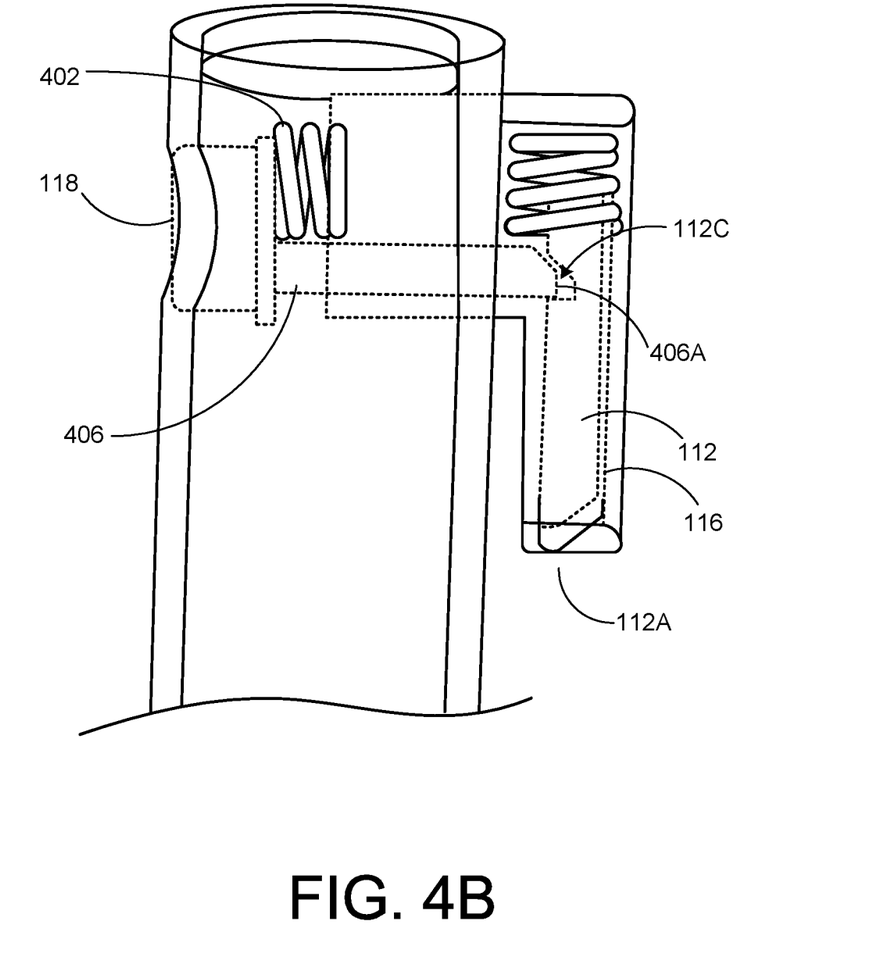
FIG. 4B is a diagram showing a portion of the electronic stylus with an electrically conductive contact retracted into an arm of a retention mechanism according to an example embodiment.

FIG. 4B is a diagram showing a portion of the electronic stylus 100 with the electrically conductive contact 112 retracted into an arm 116 of the retention mechanism 113 according to an example embodiment. In this example, pressure has been applied to the button 118. The pressure applied to the button 118 overcomes the biasing force of the coil 402 and forces the button 118 into the stylus 100, causing the rod 406 to press into the aperture 112C defined by the body 112 of the electrically conductive contact 112. A chamfered end portion 406A of the rod engages the aperture 112C defined by the electrically conductive contact 112 and forces the electrically conductive contact 112 to retract into the second arm 116 of the retention mechanism 113.

Figure 5A:
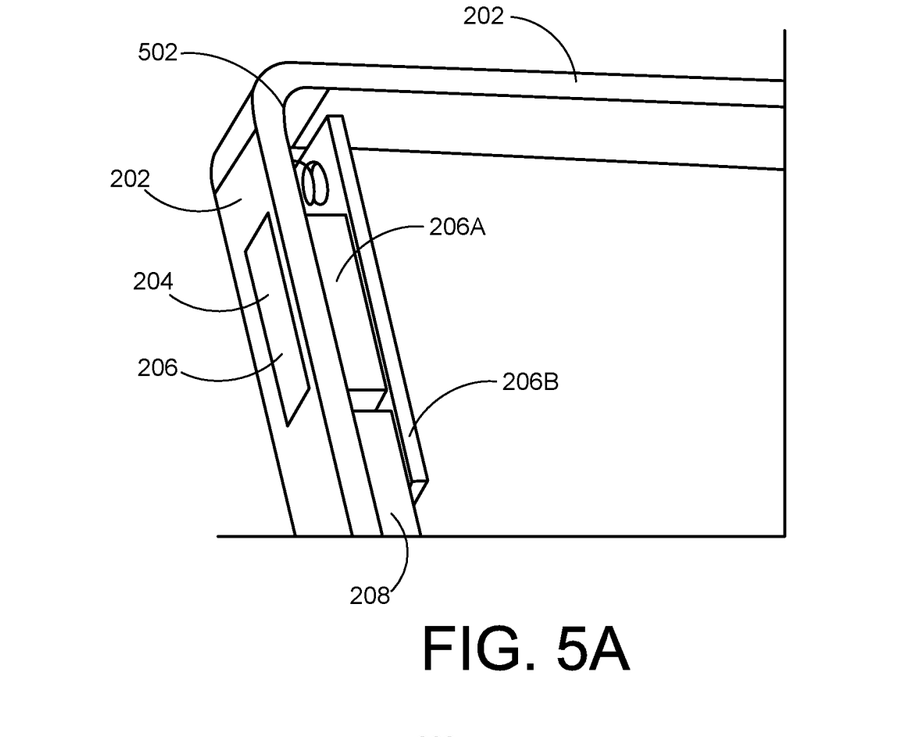
FIG. 5A is a perspective cutout view of a portion of the computing device according to an example embodiment.

FIG. 5A is a perspective cutout view of a portion of the computing device 200 according to an example embodiment. In some examples, the cover 204 is spring-loaded to rest in the aperture 204. The cover 206 can include a body portion 206A that extends into and/or rests in the aperture 204 and an elongated portion 206B that extends beyond the body portion 206A.

The computing device 200 can include a spring 502. The spring 502 can be in contact with the chassis 202 and a first end portion of the elongated portion 206B. The spring 502 can bias the body portion 206A of the cover 206 to rest in the aperture 204.

The charging pad 208 can be in contact with the chassis 202 and a second end portion of the elongated portion 206B. The contact by the charging pad 208 with the chassis 202 and the second end portion of the elongated portion 206B can keep the cover 204 flush with the chassis 202, and/or prevent the cover 204 from extending beyond the chassis 202.

Figure 5B:
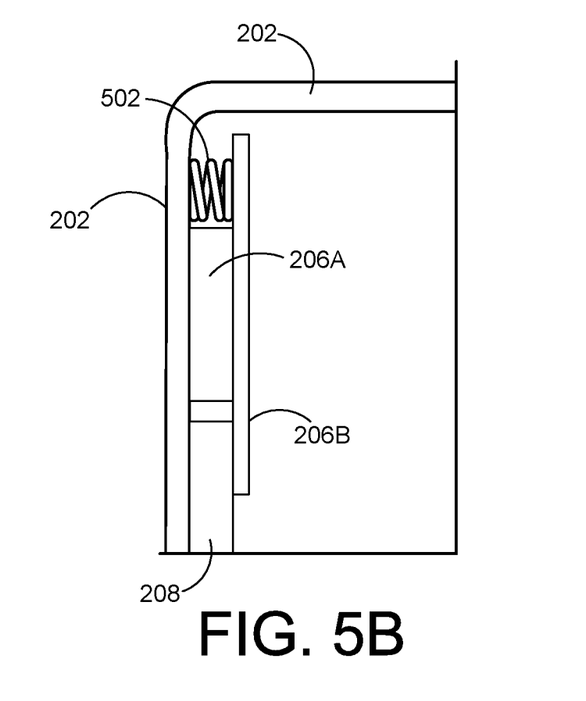
FIG. 5B is a top cutout view of a portion of the computing device according to an example embodiment.

FIG. 5B is a top cutout view of a portion of the computing device according to an example embodiment. FIG. 5B shows similar features of the computing device 200 as FIG. 5A.

Figure 6A:
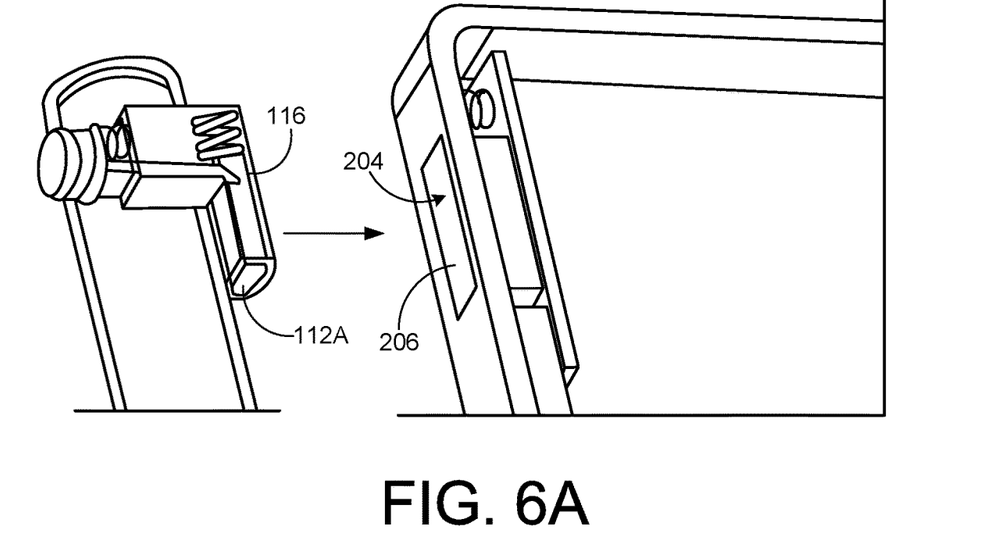
FIG. 6A is a perspective view showing portions of the electronic stylus and the computing device with the electronic stylus about to be secured to the computing device according to an example embodiment.

FIG. 6A is a perspective view showing portions of the electronic stylus 100 and the computing device 200 with the electronic stylus 100 about to be secured to the computing device 200 according to an example embodiment. The second arm portion 116 can be pressed against the cover 206 in the direction indicated by the arrow. The pressure against the cover 206 can cause the cover 206 to retract into the computing device 200. As the second arm portion 116 enters the aperture 204, the chamfered shape of the end portion 112A of the electrically conductive contact 112 can cause pressure from the chassis 202 to cause the electrically conductive contact 112 to retract into the second arm portion 116 of the retention mechanism 113.

Figure 6B:
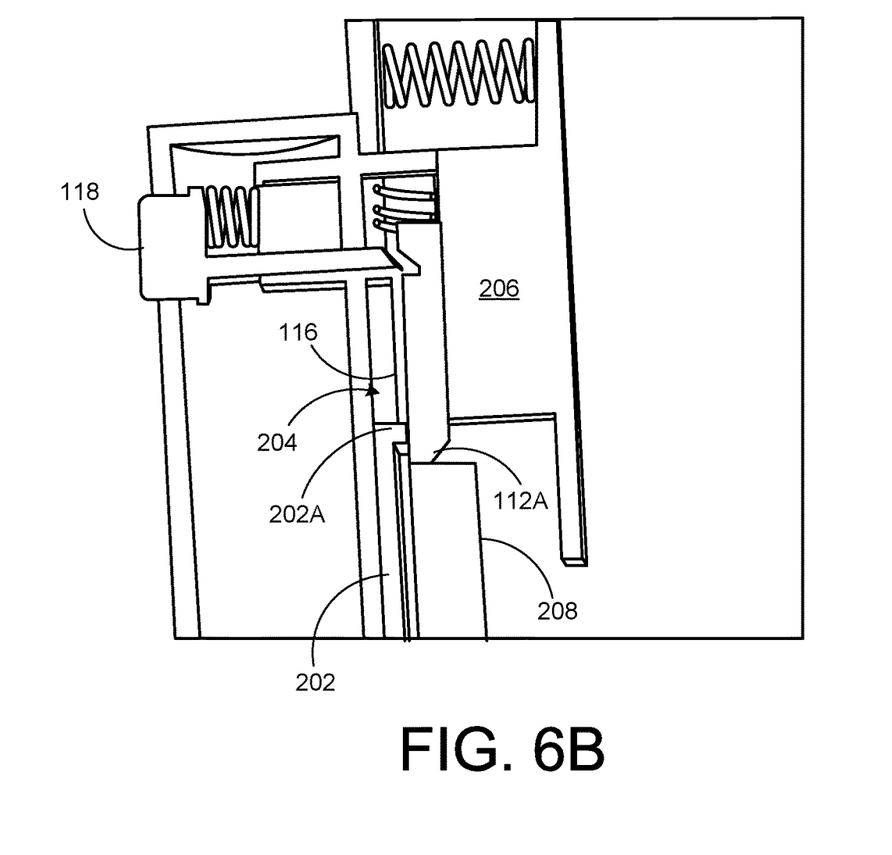
FIG. 6B is a perspective view showing portions of the electronic stylus and the computing device with the electronic stylus secured to the computing device according to an example embodiment.

FIG. 6B is a perspective view showing portions of the electronic stylus 100 and the computing device 200 with the electronic stylus 100 secured to the computing device 200 according to an example embodiment. The engagement of the end portion 112A of the electrically conductive contact 112 against an end portion 202A of the chassis 202 can secure the stylus 100 to the computing device 200. Retraction of the electrically conductive contact into the arm portion 116 of the retention mechanism 113 can end the engagement of the end portion 112A of the electrically conductive contact 112 against an end portion 202A of the chassis 202, releasing the stylus 100 from the computing device 200.

Figure 7:
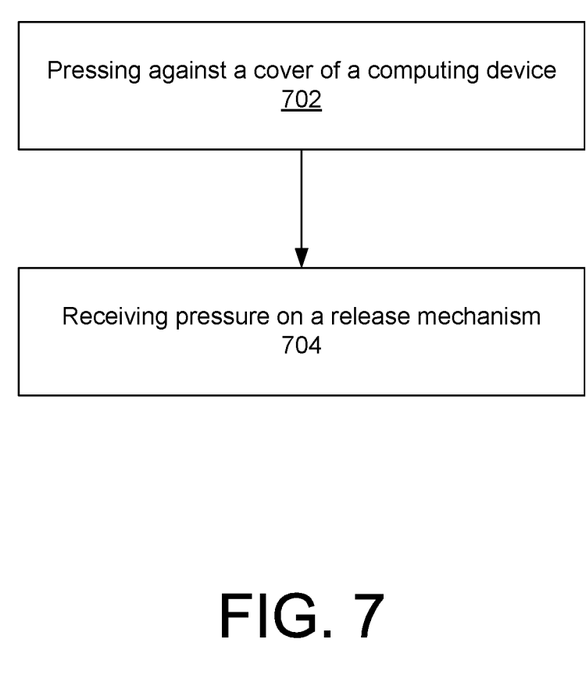
FIG. 7 is a flowchart showing a method of securing and releasing the electronic stylus to and from the computing device according to an example embodiment.

FIG. 7 is a flowchart showing a method of securing and releasing the electronic stylus 100 to and from the computing device 200 according to an example embodiment. According to some examples, the method can include pressing against the cover 206 of the computing device 200 (702). The pressing against the cover 206 can include receiving pressure on the retention mechanism 113 of the electronic stylus 100. The pressure on the retention mechanism 113 can cause the retention mechanism 113 to press against a spring-loaded cover 206 of the computing device 200. The pressing the retention mechanism 113 against the spring-loaded cover 206 can cause the spring-loaded cover 206 to retract into the computing device 200 and the electrically conductive contact 112 of the retention mechanism 113 to retract into an arm portion 116 of the retention mechanism 113 until the retention mechanism 113 is fully inserted into the computing device 200, at which point the electrically conductive contact 112 extends beyond the arm portion 116, securing the retention mechanism 113 inside the computing device 200.

The method can include receiving pressure on a release mechanism 117 (704). The receiving pressure on the release mechanism 117 can include receiving pressure on a button 118 of the release mechanism 117 of the electronic stylus 100. The pressure on the button 118 of the release mechanism 117 can cause the electrically conductive contact 112 to retract into the arm portion 116, releasing the electronic stylus 100 from the computing device 200.

According to some examples, the causing the spring-loaded cover 206 to retract can comprise causing a spring 502 inside the computing device 200 to lengthen.

According to some examples, the pressure on the button 118 of the release mechanism 117 can cause a spring 402 inside the retention mechanism to contract.

According to some examples, the extension of the electrically conductive contact 112 beyond the arm portion 116 can cause the electrically conductive contact 112 to be electrically coupled to a charging pad 208 of the computing device 200.

Figure 8:
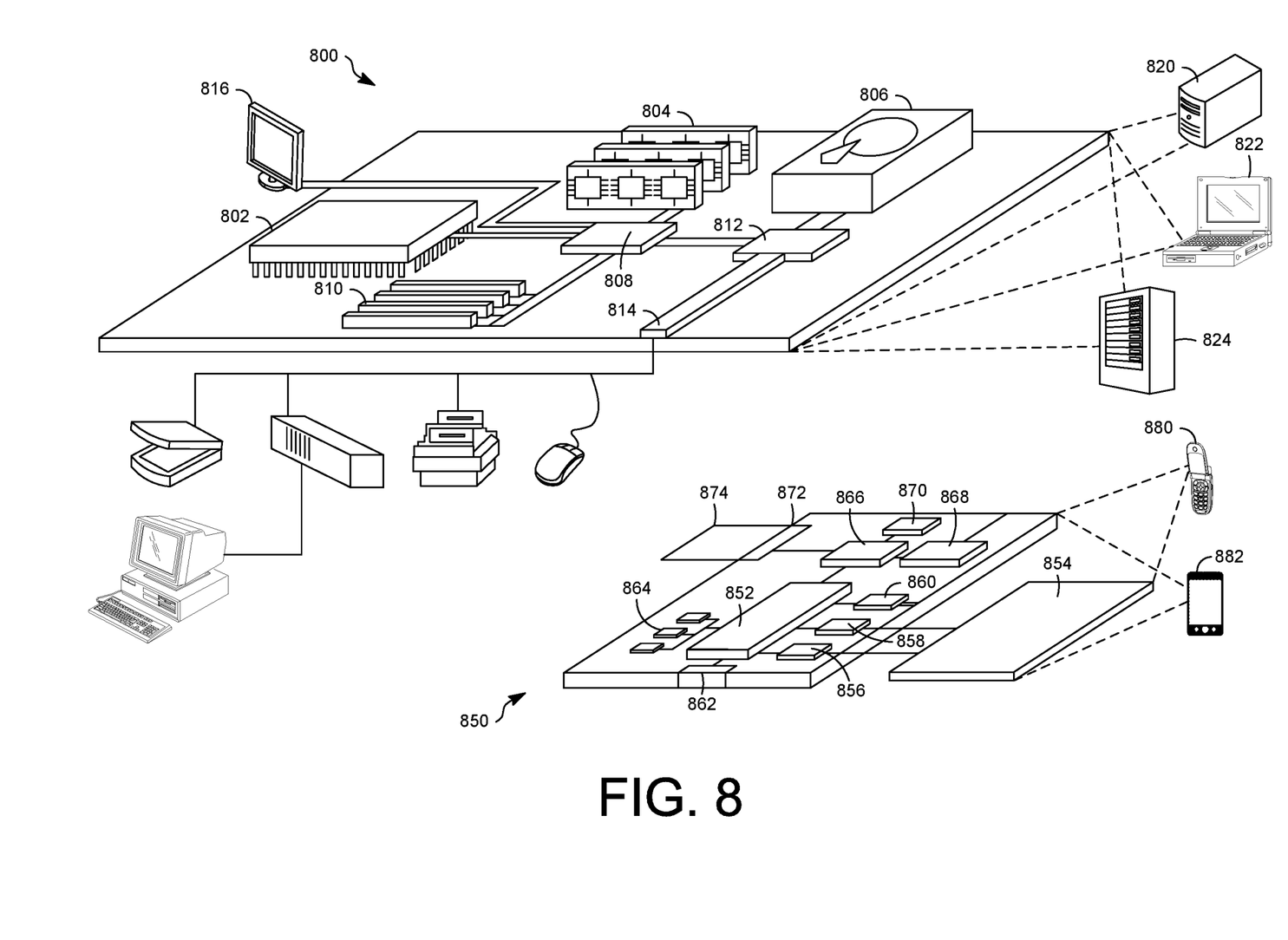
FIG. 8 shows an example of a computer device and a mobile computer device that can be used to implement the techniques described here.

FIG. 8 shows an example of a generic computer device 800 and a generic mobile computer device 850, which may be used with the techniques described here. The computer devices 800, 850 can be examples of the computing device 200 described above. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube)

or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An electronic stylus comprising:
    an elongated body;
    a rechargeable battery supported by the elongated body;
    a retention mechanism extending from the elongated body, the retention mechanism including an arm and an electrically conductive contact, the electrically conductive contact extending through the arm and being electrically coupled to the rechargeable battery; and
    a release mechanism configured to cause the electrically conductive contact to retract within the retention mechanism.

2. The electronic stylus of claim 1, wherein the release mechanism comprises a button, the release mechanism being configured to cause the electrically conductive contact to retract within the retention mechanism in response to pressure applied to the button.

3. The electronic stylus of claim 2, wherein the release mechanism further comprises a spring, the spring biasing the button away from the elongated body.

4. The electronic stylus of claim 1, wherein the electrically conductive contact comprises a chamfered clip, the chamfered clip being biased to extend away from the retention mechanism.

5. The electronic stylus of claim 4, wherein the retention mechanism comprises a spring biasing the chamfered clip to extend away from the retention mechanism.

6. The electronic stylus of claim 1, wherein the electrically conductive contact is configured to conduct current to the rechargeable battery, the current recharging the rechargeable battery.

7. The electronic stylus of claim 1, wherein the electronic stylus comprises a location transmitter configured to prompt a computing device to modify a presentation on a display of the computing device at a location near a writing end portion of the elongated body.

8. The electronic stylus of claim 7, wherein:
    the retention mechanism is disposed closer to a back end portion of the elongated body than to the writing end portion of the elongated body, the back end portion being opposite from the writing end portion; and
    the location transmitter is disposed closer to the writing end portion than to the back end portion.

9. The electronic stylus of claim 1, wherein the arm comprises:
    a first arm portion extending away from the elongated body; and
    a second arm portion extending from the first arm portion in a direction that is parallel to a direction that the elongated body extends,
    wherein the electrically conductive contact extends through both the first arm portion and the second arm portion.

10. The electronic stylus of claim 9, wherein:
    the electrically conductive contact is biased to extend beyond the second arm portion; and
    the release mechanism is configured to cause the electrically conductive contact to retract into the second arm portion.

11. A method of securing and releasing an electronic stylus to and from a computing device, the method comprising:
    receiving pressure on a retention mechanism of the electronic stylus, the pressure on the retention mechanism causing the retention mechanism to press against a spring-loaded cover of the computing device, the pressing the retention mechanism against the spring-loaded cover causing the spring-loaded cover to retract into the computing device and an electrically conductive contact of the retention mechanism to retract into an arm portion of the retention mechanism until the retention mechanism is fully inserted into the computing device, at which point the electrically conductive contact extends beyond the arm portion, securing the retention mechanism inside the computing device; and
    receiving pressure on a button of a release mechanism of the electronic stylus, the pressure on the button of the release mechanism causing the electrically conductive contact to retract into the arm portion, releasing the electronic stylus from the computing device.

12. The method of claim 11, wherein the causing the spring-loaded cover to retract comprises causing a spring inside the computing device to contract.

13. The method of claim 11, wherein the pressure on the button of the release mechanism causes a spring inside the retention mechanism to retract.

14. The method of claim 11, wherein the extension of the electrically conductive contact beyond the arm portion causes the electrically conductive contact to be electrically coupled to a charging pad of the computing device.

15. A computing device comprising:
    a processor;
    a power source electrically coupled to the processor;

a chassis enclosing the processor and the power source, the chassis defining an aperture;

a spring-loaded cover biased to rest in the aperture and configured to retract into the chassis in response to pressure; and a charging pad adjacent to the spring-loaded cover, the charging pad being electrically coupled to the power source.

16. The computing device of claim 15, further comprising a touchscreen, the touchscreen being supported by the chassis and electrically coupled to both the processor and the power source.

17. The computing device of claim 15, further comprising a spring that biases the spring-loaded cover to rest in the aperture, the spring extending in response to pressure on the spring-loaded cover.

18. The computing device of claim 15, wherein the spring-loaded cover is biased to be flush with an outer surface of the chassis.

19. The computing device of claim 15, further comprising a cover base, the cover base being attached to the spring-loaded cover and pressing against the charging pad when the spring-loaded cover is resting in the aperture.

20. The computing device of claim 15 wherein, when the spring-loaded cover is resting in the aperture, the chassis, the spring-loaded cover, and the charging pad define a gap between the chassis, the spring-loaded cover, and the charging pad.

21. A system comprising:
a computing device comprising:
a processor;
a power source electrically coupled to the processor;
a chassis enclosing the processor and the power source, the chassis defining an aperture;
a spring-loaded cover biased to rest in the aperture and configured to retract into the chassis in response to pressure; and
a charging pad adjacent to the spring-loaded cover, the charging pad being electrically coupled to the power source; and
an electronic stylus comprising:
an elongated body comprising a writing end portion and a back end portion being opposite from the writing end portion;
a rechargeable battery supported by the elongated body;
a retention mechanism extending from the elongated body, the retention mechanism including an arm and an electrically conductive contact, the electrically conductive contact extending through the arm and being electrically coupled to the rechargeable battery, the retention mechanism pressing the spring-loaded cover into the computing device, the electrically conductive contact being coupled to the charging pad, conducting current to the rechargeable battery, and securing the electronic stylus to the computing device by engaging the chassis; and
a release mechanism configured to cause the electrically conductive contact to retract within the retention mechanism, disengaging the electrically conductive contact and releasing the electronic stylus from the computing device.

* * * * *